United States Patent
Kawashima et al.

(10) Patent No.: US 6,995,567 B2
(45) Date of Patent: Feb. 7, 2006

(54) FAILURE DETECTION SYSTEM FOR ELECTRIC POWER STEERING SYSTEM

(75) Inventors: Mitsunori Kawashima, Wako (JP); Masato Yuda, Wako (JP); Hiroaki Ishigaki, Haga-Machi (JP)

(73) Assignee: Honda Motor Co., Ltd., Minato-ku (JP)

( * ) Notice: Subject to any disclaimer, the term of this patent is extended or adjusted under 35 U.S.C. 154(b) by 0 days.

(21) Appl. No.: 10/926,468

(22) Filed: Aug. 25, 2004

(65) Prior Publication Data

US 2005/0088126 A1   Apr. 28, 2005

(30) Foreign Application Priority Data

Aug. 25, 2003  (JP) .............................. 2003-299460

(51) Int. Cl.
   *G01R 31/08*   (2006.01)
(52) U.S. Cl. ...................................... 324/522; 318/293
(58) Field of Classification Search ................ 180/404, 180/443; 324/503, 509, 522; 701/39, 48; 318/430, 803, 293
   See application file for complete search history.

(56) References Cited

U.S. PATENT DOCUMENTS 5,303,156 A * 4/1994 Matsuoka et al. ............ 701/43
6,439,336 B2 * 8/2002 Noro et al. .................. 180/404

FOREIGN PATENT DOCUMENTS

JP   2000-190861   7/2000

* cited by examiner

*Primary Examiner*—Walter Benson
(74) *Attorney, Agent, or Firm*—Hamre, Schumann, Mueller & Larson, P.C.

(57) ABSTRACT

The invention relates to a failure detection system for an electric power steering system. The system detects ON failure of one of first to fourth switching elements of an H-bridge circuit of the electric power steering system. The system detects ON failure by measuring the value of the current and the fluctuation in the value of the current. Therefore, the system can detect ON failures even when the value of the current is within normal ranges.

3 Claims, 9 Drawing Sheets

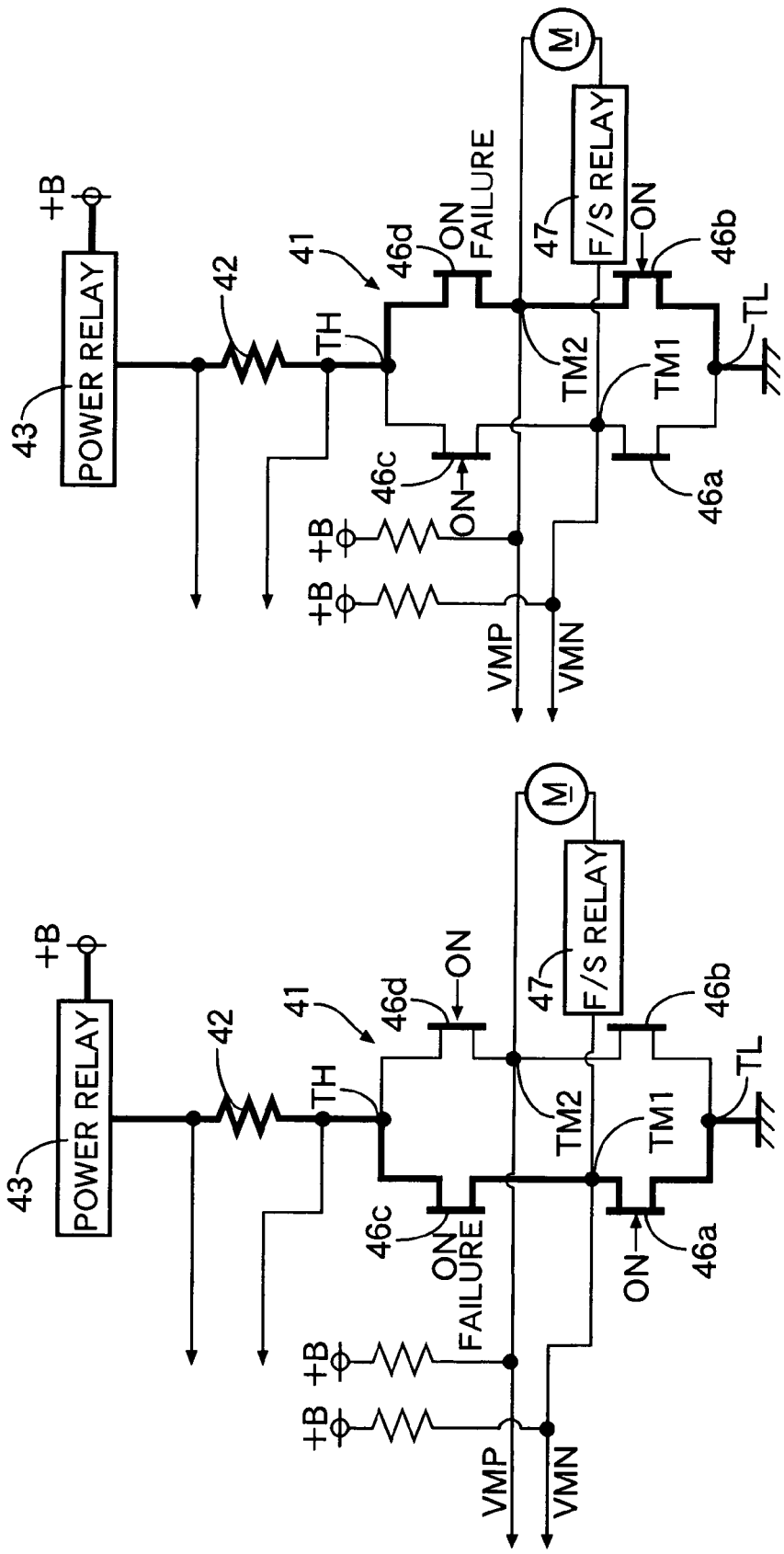

FAILURE DETECTION SYSTEM FOR ELECTRIC POWER STEERING SYSTEM

CROSS REFERENCE TO RELATED APPLICATIONS

This application is based on Japan patent no. 2003-299,460 filed Aug. 25, 2003.

FIELD OF THE INVENTION

The present invention relates to a failure detection system for an electric power steering system. The failure detection system includes a bridge circuit that is disposed between a battery and a steering motor that drives the motor in forward and reverse directions, actual current detection means for detecting the actual current supplied from the battery to the motor via the bridge circuit, and control means for carrying out feedback control so that the actual current coincides with a target current.

BACKGROUND OF THE INVENTION

An arrangement in which a motor of an electric power steering system is driven via an H-bridge circuit equipped with four switching elements is known from Japanese Patent Application Laid-open No. 2000-190861. By turning ON two switching elements in a first diagonal relationship among the four switching elements of the H-bridge circuit, the motor can be driven in a forward direction, and by turning ON two switching elements in a second diagonal relationship, the motor can be driven in a reverse direction.

There is a known method for detecting an ON failure of a switching element (failure in which the switching element is stuck in an ON state and cannot be turned OFF) by monitoring the actual current that is supplied from a battery to a motor via an H-bridge circuit during operation of an electric power steering system. That is, when two switching elements in a diagonal relationship are turned ON in order to drive the motor, if another switching element has an ON failure, the high voltage side and the low voltage side of the H-bridge circuit are short-circuited via two switching elements among these three switching elements to generate an excessive current flow which would not normally flow. When current detection means detects this excessive current, it can be determined that there is an ON failure of the switching element.

However, when the voltage of the battery is low or the electrical resistance is increased due to deterioration of a harness, the excessive current becomes small, and thus there is no obvious difference from the current flowing through the motor when the electric power steering system is operating normally. By merely monitoring the current by the current detection means to check whether the current becomes an upper limit value or more, it is difficult to reliably determine whether there is an ON failure of a switching element.

SUMMARY OF THE INVENTION

The present invention has been achieved under the above-mentioned circumstances, and it is an object thereof to enable reliable detection of an ON failure of a switching element of a bridge circuit of an electric power steering system.

In order to attain this object, in accordance with a first aspect of the present invention, there is proposed a failure detection system for an electric power steering system, including: a bridge circuit that is disposed between a battery and a steering motor and drives the motor in forward and reverse directions; actual current detection means for detecting the actual current supplied from the battery to the motor via the bridge circuit; and control means for carrying out feedback control so that the actual current coincides with a target current, the bridge circuit including: a high voltage terminal connected to a positive pole of the battery; a low voltage terminal connected to a negative pole of the battery; first and second output terminals connected to the motor; a first switching element providing a connection between the low voltage terminal and the first output terminal; a second switching element providing a connection between the low voltage terminal and the second output terminal; a third switching element providing a connection between the high voltage terminal and the first output terminal; and a fourth switching element providing a connection between the high voltage terminal and the second output terminal, wherein the control means determines that there is an ON failure among the first to the fourth switching elements based on a first cumulative time for which the actual current is equal to or greater than an upper limit value until a timer has timed up and a second cumulative time for which the actual current is equal to or less than a lower limit value until the timer has timed up.

Furthermore, in accordance with a second aspect of the present invention, in addition to the first aspect, the control means disables determination of an ON failure among the first to the fourth switching elements if the first cumulative time reaches a second predetermined time when the timer has reached a first predetermined time.

Moreover, in accordance with a third aspect of the present invention, in addition to the first aspect, the control means disables determination of an ON failure among the first to the fourth switching elements when a state in which the actual current is equal to or greater than a first threshold value and the deviation of the actual current from the target current is less than a second threshold value exists for a third predetermined time or greater.

A motor current detection circuit of an embodiment corresponds to the actual current detection means of the present invention, a main timer of the embodiment corresponds to the timer of the present invention, an upper cumulative counter of the embodiment corresponds to the first cumulative time of the present invention, a lower cumulative counter of the embodiment corresponds to the second cumulative time of the present invention, and an electronic control unit of the embodiment corresponds to the control means of the present invention.

In accordance with the first aspect of the present invention, an ON failure among the first to the fourth switching elements is determined based on the first cumulative time for which the actual current detected by the current detection means is equal to or greater than the upper limit value until the timer has timed up and the second cumulative time for which it is equal to or less than the lower limit value. Therefore, it is possible to accurately recognize hunting of the actual current caused by current feedback control for making the actual current coincide with the target current when there is an ON failure, thus carrying out a correct failure determination. In particular, even when the hunting actual current is within the range of variation of the actual current when it is normal, by taking into consideration both the first cumulative time and the second cumulative time it is possible to reliably distinguish between a variation of the actual current when it is normal and a variation of the actual current when there is an ON failure.

In accordance with the second aspect of the present invention, if the first cumulative time reaches the second predetermined time when the timer has reached the first predetermined time, that is, if the first cumulative time, for which the actual current is equal to or greater than the upper limit value, represents a large proportion of the time, it is determined that the actual current is not hunting and determination of an ON failure is disabled. Therefore, it is possible to prevent erroneous determination of an ON failure.

In accordance with the third aspect of the present invention, when a state in which the actual current is equal to or greater than the first threshold value and the deviation of the actual current from the target current is less than the second threshold value exists for the third predetermined time or greater, that is, when the state in which the deviation is small exists for a large proportion of the time, it is determined that the actual current is not hunting and determination of an ON failure is disabled. Therefore, it is possible to prevent an erroneous determination of an ON failure.

The present invention will be described below with reference to an embodiment of the present invention shown in the attached drawings.

BRIEF DESCRIPTION OF THE DRAWINGS

FIG. 6A and FIG. 6B are diagrams for explaining the operation when there is an ON failure of a switching element;

DETAILED DESCRIPTION OF THE PREFERRED EMBODIMENT

Figure 1:
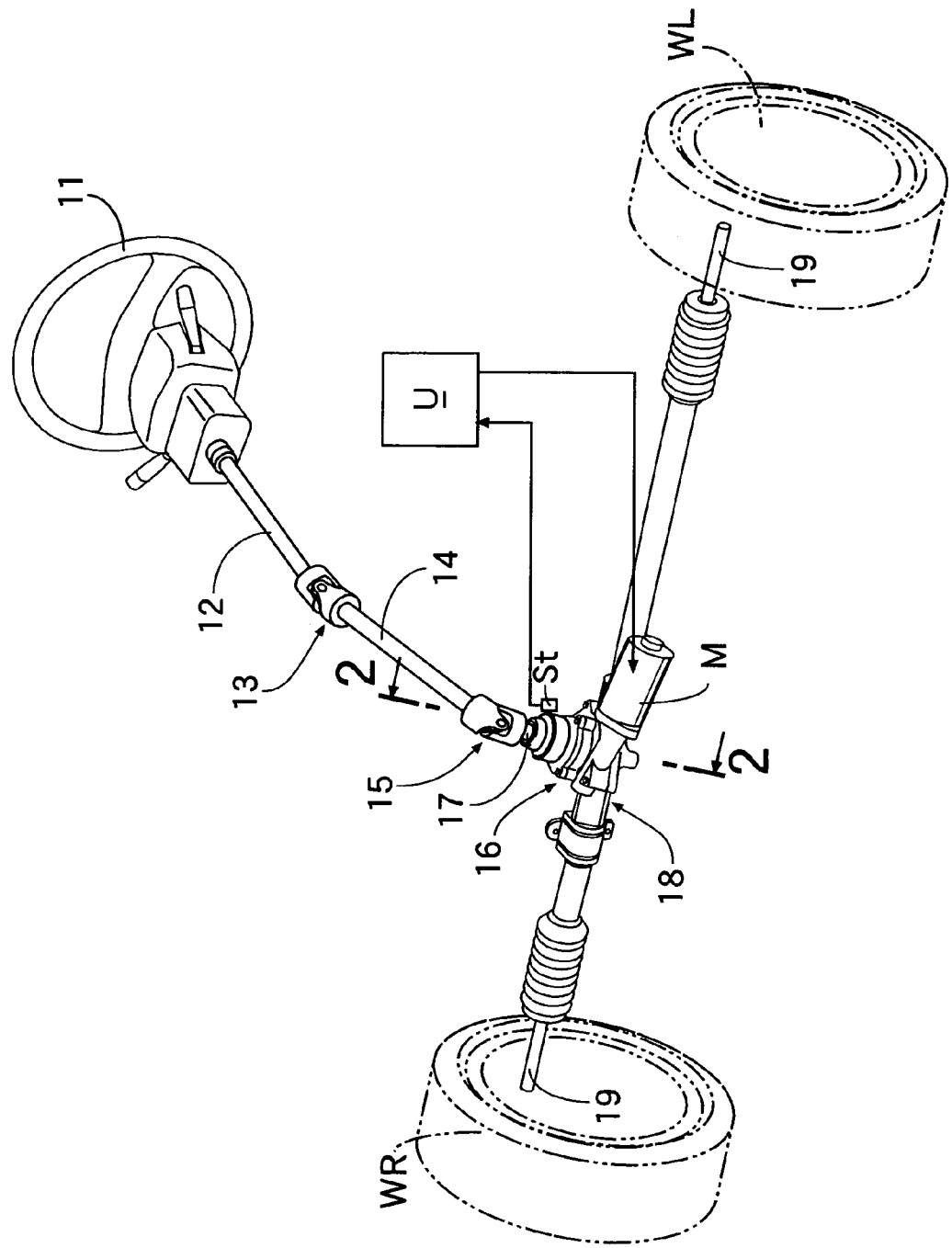
FIG. 1 is an overall perspective view of an electric power steering system.

As shown in FIG. 1, an upper steering shaft 12 rotating integrally with a steering wheel 11 is connected to a pinion shaft 17 via an upper universal joint 13, a lower steering shaft 14, and a lower universal joint 15, the pinion shaft 17 projecting upward from a reduction gear 16. Tie rods 19 project from left and right ends of a steering gearbox 18 connected to the lower end of the reduction gear 16 and are connected to knuckles (not illustrated) of left and right wheels WL and WR. A motor M is supported on the reduction gear 16, and operation of the motor M is controlled by an electronic control unit U, into which a signal is input from a steering torque sensor St housed within the reduction gear 16.

Figure 2:
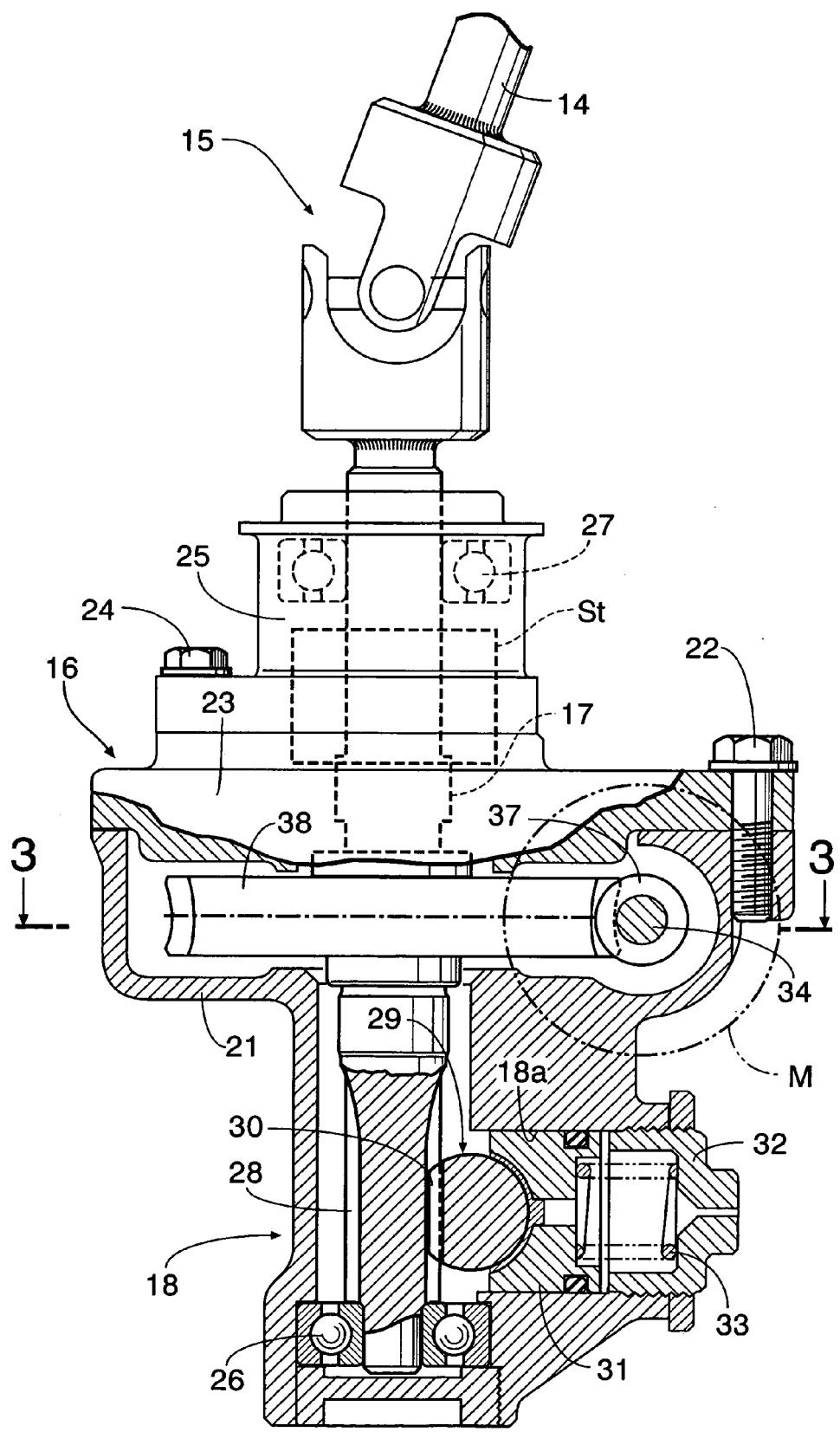
FIG. 2 is an enlarged sectional view along line 2—2 in FIG. 1.
Figure 3:
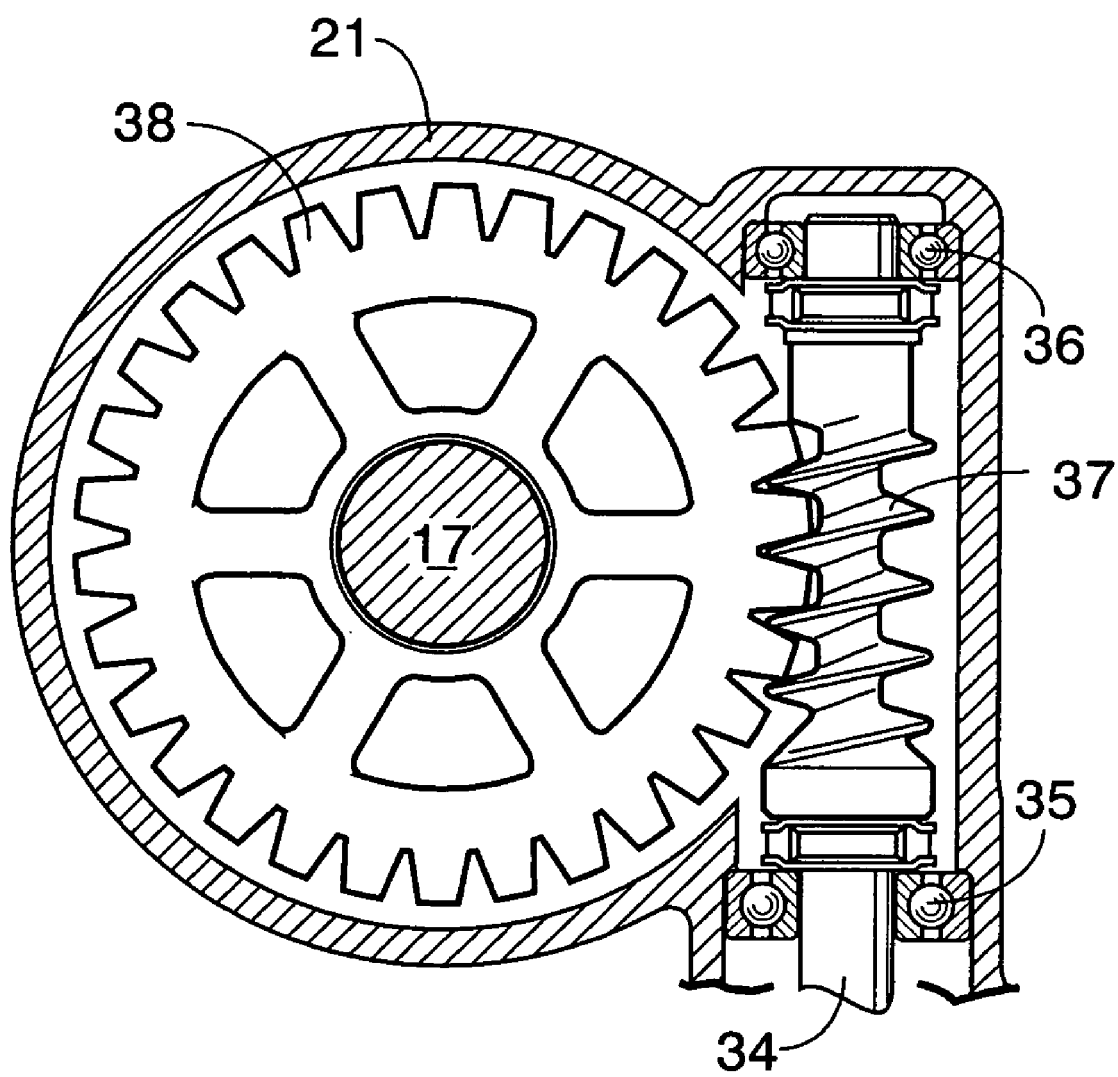
FIG. 3 is a sectional view along line 3—3 in FIG. 2.

As shown in FIG. 2 and FIG. 3, the reduction gear 16 includes a lower case 21, a middle case 23, and an upper case 25, the lower case 21 being integral with the steering gearbox 18, the middle case 23 being joined to an upper face of the lower case 21 by bolts 22, and the upper case 25 being joined to an upper face of the middle case 23 by bolts 24. The pinion shaft 17 is rotatably supported in the steering gearbox 18 and the upper case 25 via ball bearings 26 and 27. A pinion 28 provided at the lower end of the pinion shaft 17 meshes with a rack 30 provided on a rack bar 29 supported in a laterally movable manner within the steering gearbox 18. A pressing member 31 is slidably housed in a through hole 18a formed in the steering gearbox 18, and flexure of the rack bar 29 is suppressed by urging the pressing member 31 toward a back face of the rack bar 29 by means of a spring 33 disposed between the pressing member 31 and a nut 32 blocking the through hole 18a.

A rotating shaft 34 of the motor M, which extends into the interior of the reduction gear 16, is rotatably supported in the lower case 21 by a pair of ball bearings 35 and 36, and a worm 37 provided on the rotating shaft 34 of the motor M meshes with a worm wheel 38 fixed to the pinion shaft 17.

When the motor M is driven, the torque of the rotating shaft 34 is therefore transmitted to the pinion shaft 17 via the worm 37 and the worm wheel 38, and a steering operation by a driver is thus assisted by the motor M.

Figure 4:
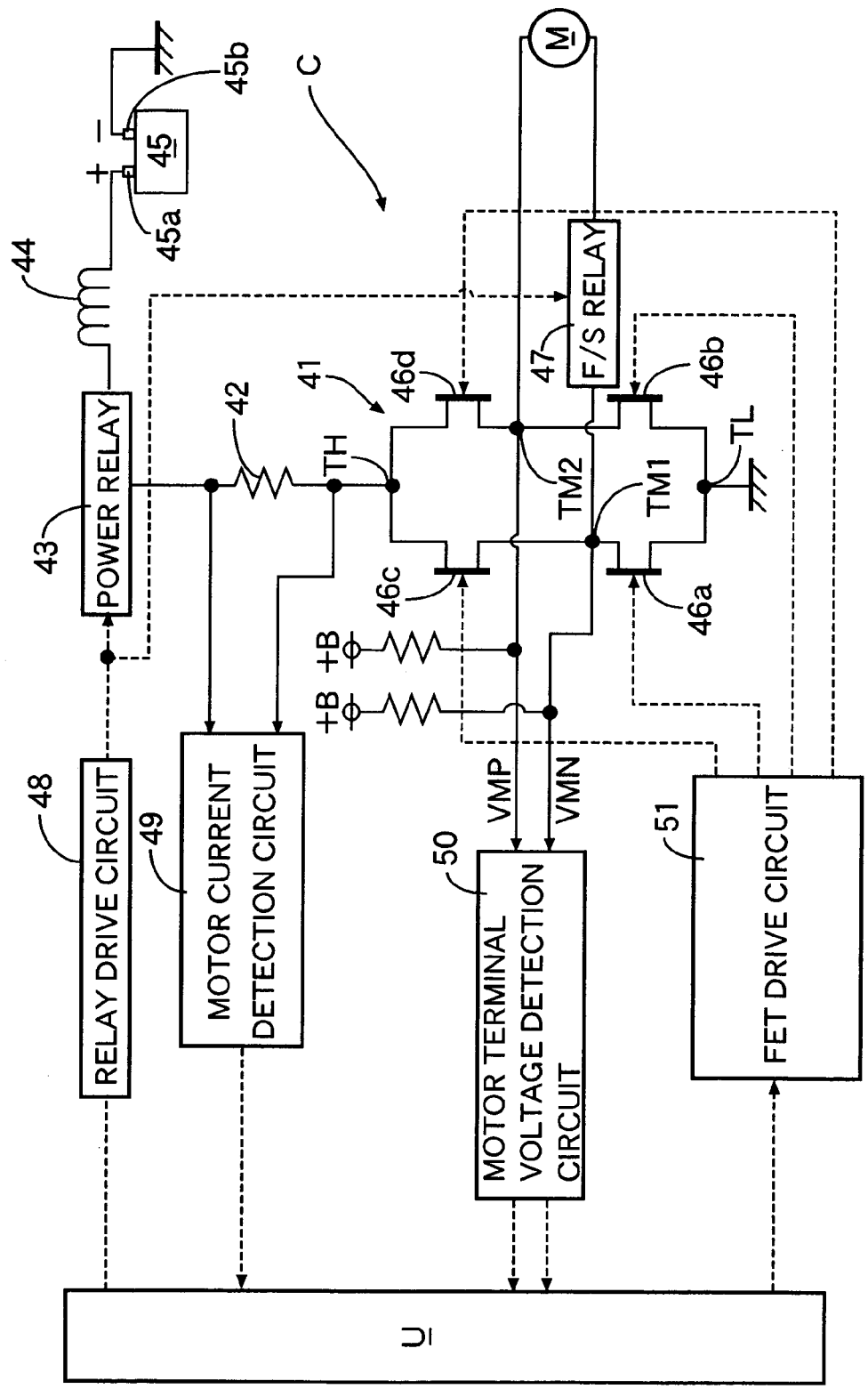
FIG. 4 is a diagram showing a drive circuit for a motor.

FIG. 4 shows a motor drive circuit C for driving the motor M with commands from the electronic control unit U. The motor drive circuit C includes an H-bridge circuit 41 in which a high voltage terminal TH is connected to a positive pole 45a of a vehicle-mounted 12V battery 45 via a shunt resistor 42, a power relay 43, and a choke coil 44, and a low voltage terminal TL is grounded and connected to a negative pole 45b of the battery 45. A first output terminal TM1 and a second output terminal TM2 of the H-bridge circuit 41 are connected to the motor M. The low voltage terminal TL and the first output terminal TM1 are connected to each other via a first switching element 46a. The low voltage terminal TL and the second output terminal TM2 are connected to each other via a second switching element 46b. The high voltage terminal TH and the first output terminal TM1 are connected to each other via a third switching element 46c. The high voltage terminal TH and the second output terminal TM2 are connected to each other via a fourth switching element 46d. The first to the fourth switching elements 46a to 46d are, for example, field-effect transistors (FET). A fail-safe relay 47 is disposed between the motor M and either the first output terminal TM1 or the second output terminal TM2 (the first output terminal TM1 in this embodiment).

The power relay 43, which turns ON and OFF the supply of power from the battery 45 to the H-bridge circuit 41, and the fail-safe relay 47, which stops the motor M when there is an abnormality, are connected to a common relay drive circuit 48 controlled by the electronic control unit U, and the power relay 43 and the fail-safe relay 47 are operated in association with each other to be turned ON and OFF. That is, when the power relay 43 is turned ON, the fail-safe relay 47 is also turned ON, and when the power relay 43 is turned OFF, the fail-safe relay 47 is also turned OFF, thereby reducing the cost and the failure rate of the relay drive circuit 48.

The shunt resistor 42, which is disposed between the power relay 43 and the H-bridge circuit 41, is connected to a motor current detection circuit 49 that is connected to the electronic control unit U and detects the current supplied from the battery 45 to the H-bridge circuit 41 based on the potential difference between opposite ends of the shunt resistor 42 and the resistance of the shunt resistor 42.

A potential VMN of the first output terminal TM1 and a potential VMP of the second output terminal TM2, that is, the potentials of opposite terminals of the motor M, are detected by a motor terminal voltage detection circuit 50 connected to the electronic control unit U. When the motor M is not operating, the potential VMN of the first output terminal TM1 and the potential VMP of the second output terminal TM2 are pulled up to 2 V to 3 V by the battery 45.

Figure 5A:
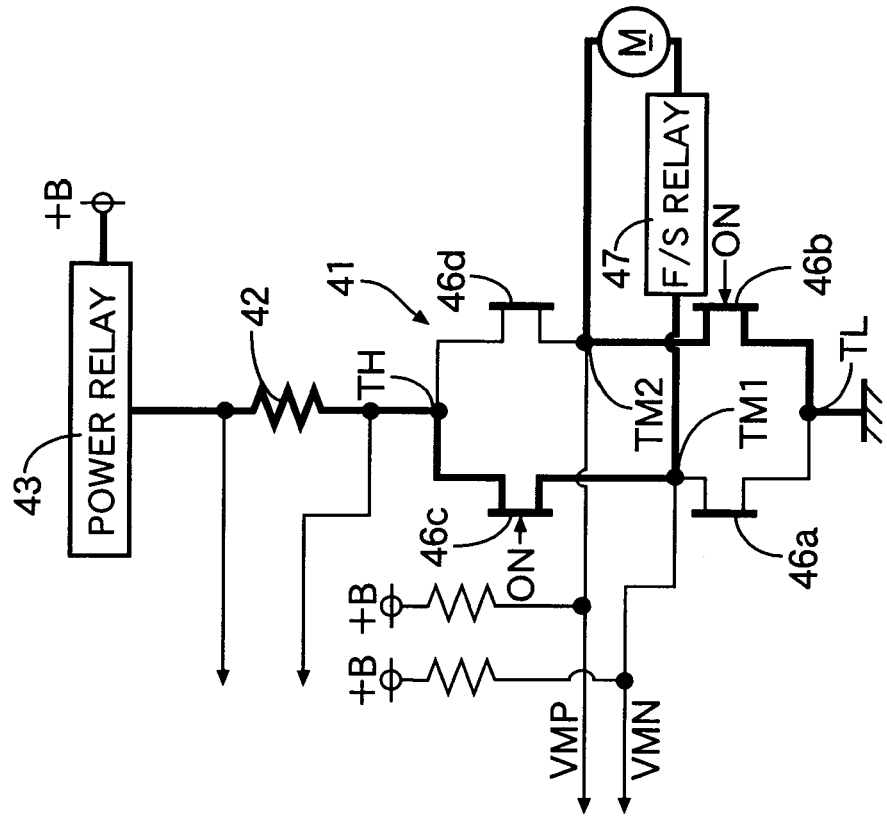
FIG. 5A and FIG. 5B are diagrams for explaining the operation when the motor rotates in forward and reverse directions.

The first to the fourth switching elements 46a to 46d of the H-bridge circuit 41 are duty-cycle controlled by a switching element drive circuit 51 connected to the electronic control unit U. That is, as shown in FIG. 5A, when the first switching element 46a and the fourth switching element 46d, which are arranged in a diagonal relationship, are turned ON, the first output terminal TM1 is connected to the low voltage terminal TL and becomes 0 V, the second output terminal TM2 is connected to the high voltage terminal TH and becomes 12 V, and therefore the motor M rotates in the forward direction. In this process, it is possible to control the current flowing through the motor M by controlling the duty ratio of either the first switching element 46a or the fourth switching element 46d.

Figure 5B:
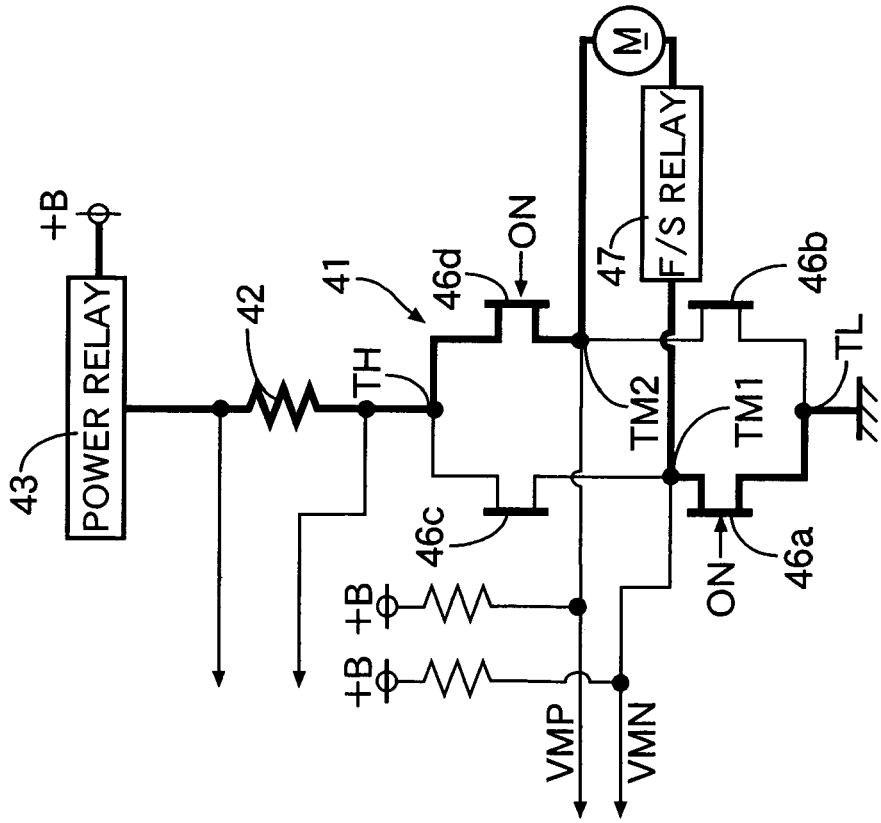

As shown in FIG. 5B, when the second switching element 46b and the third switching element 46c, which are arranged in another diagonal relationship, are turned ON, the second output terminal TM2 is connected to the low voltage terminal TL and becomes 0 V, the first output terminal TM1 is connected to the high voltage terminal TH and becomes 12 V, and therefore the motor M rotates in the reverse direction. In this process, it is possible to control the current flowing through the motor M by controlling the duty ratio of either the second switching element 46b or the third switching element 46c.

Detection of an ON failure among the first to the fourth switching elements 46a to 46d is now explained.

As shown in FIG. 6A, for example, when the first switching element 46a and the fourth switching element 46d, which are in a diagonal relationship, are turned ON in order to rotate the motor M in the forward direction, if there is an ON failure of the third switching element 46c, the high voltage terminal TH and the low voltage terminal TL are short-circuited via the third switching element 46c and the first switching element 46a, a large current flows through the shunt resistor 42, and this current is detected by the motor current detection circuit 49. Similarly, if there is an ON failure of the second switching element 46b, the high voltage terminal TH and the low voltage terminal TL are short-circuited via the fourth switching element 46d and the second switching element 46b, a large current flows through the shunt resistor 42, and this current is detected by the motor current detection circuit 49.

As shown in FIG. 6B, for example, when the second switching element 46b and the third switching element 46c, which are in a diagonal relationship, are turned ON in order to drive the motor M in the reverse direction, if there is an ON failure of the fourth switching element 46d, the high voltage terminal TH and the low voltage terminal TL are short-circuited via the fourth switching element 46d and the second switching element 46b, a large current flows through the shunt resistor 42, and this current is detected by the motor current detection circuit 49. Similarly, if there is an ON failure of the first switching element 46a, the high voltage terminal TH and the low voltage terminal TL are short-circuited via the third switching element 46c and the first switching element 46a, a large current flows through the shunt resistor 42, and this current is detected by the motor current detection circuit 49.

The actual current detected by the motor current detection circuit 49 during operation of the electric power steering system is compared with the target current in the electronic control unit U, and current feedback control is carried out so that the actual current coincides with the target current. In this process, if an excessive current is detected as the actual current of the motor M due to an ON failure among the first to the fourth switching elements 46a to 46d, the deviation of the actual current from the target current increases, feedback control is carried out so as to decrease the actual current, and the actual current decreases rapidly. As a result, the deviation of the actual current from the target current increases in the opposite direction this time, feedback control is carried out so as to increase the actual current, and the actual current increases rapidly. Due to this repetition, a hunting phenomenon occurs in which the actual current detected by the motor current detection circuit 49 increases and decreases with a short cycle.

Figure 7:
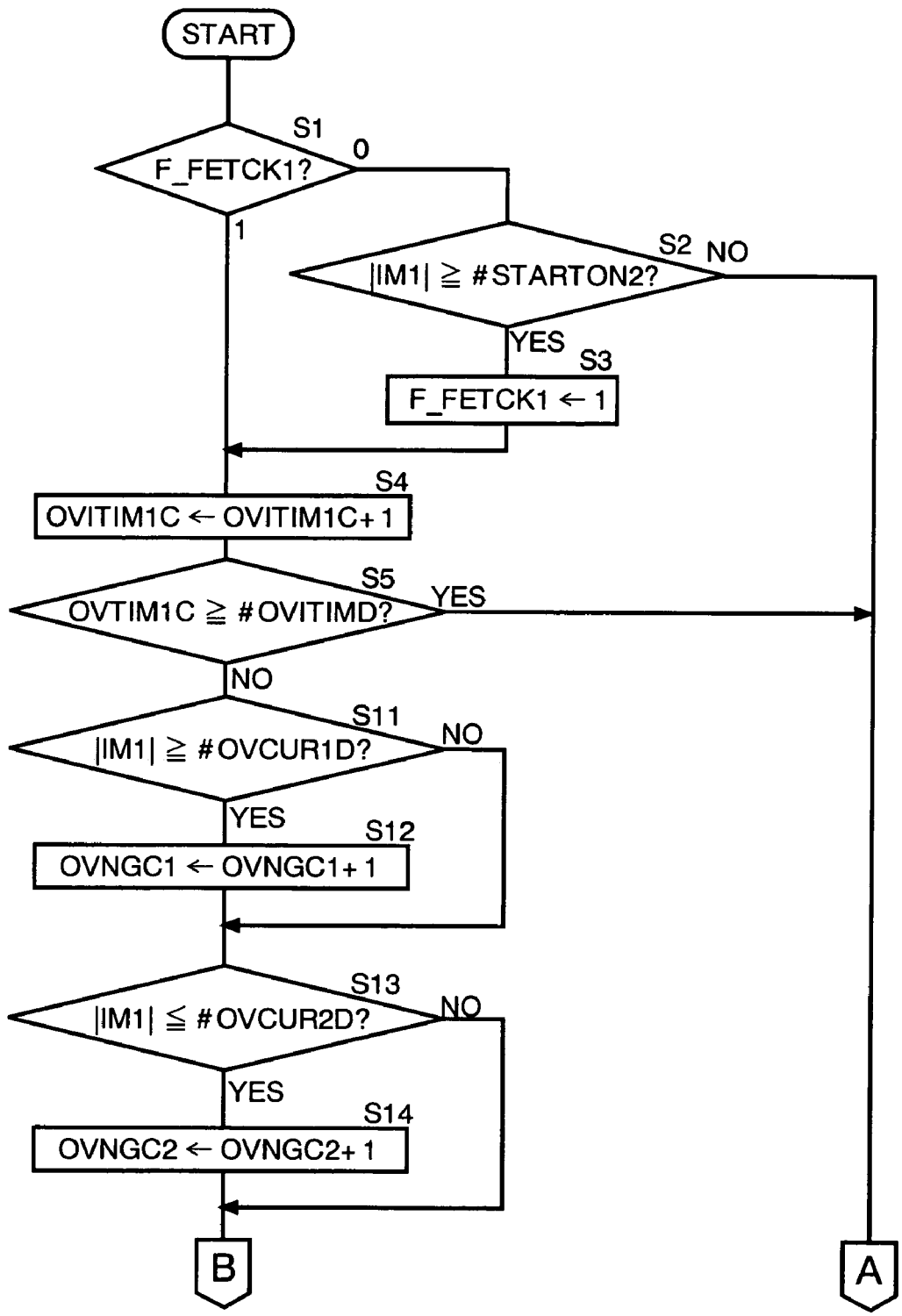
FIG. 7 is a first section of a flowchart for explaining the operation.
Figure 8:
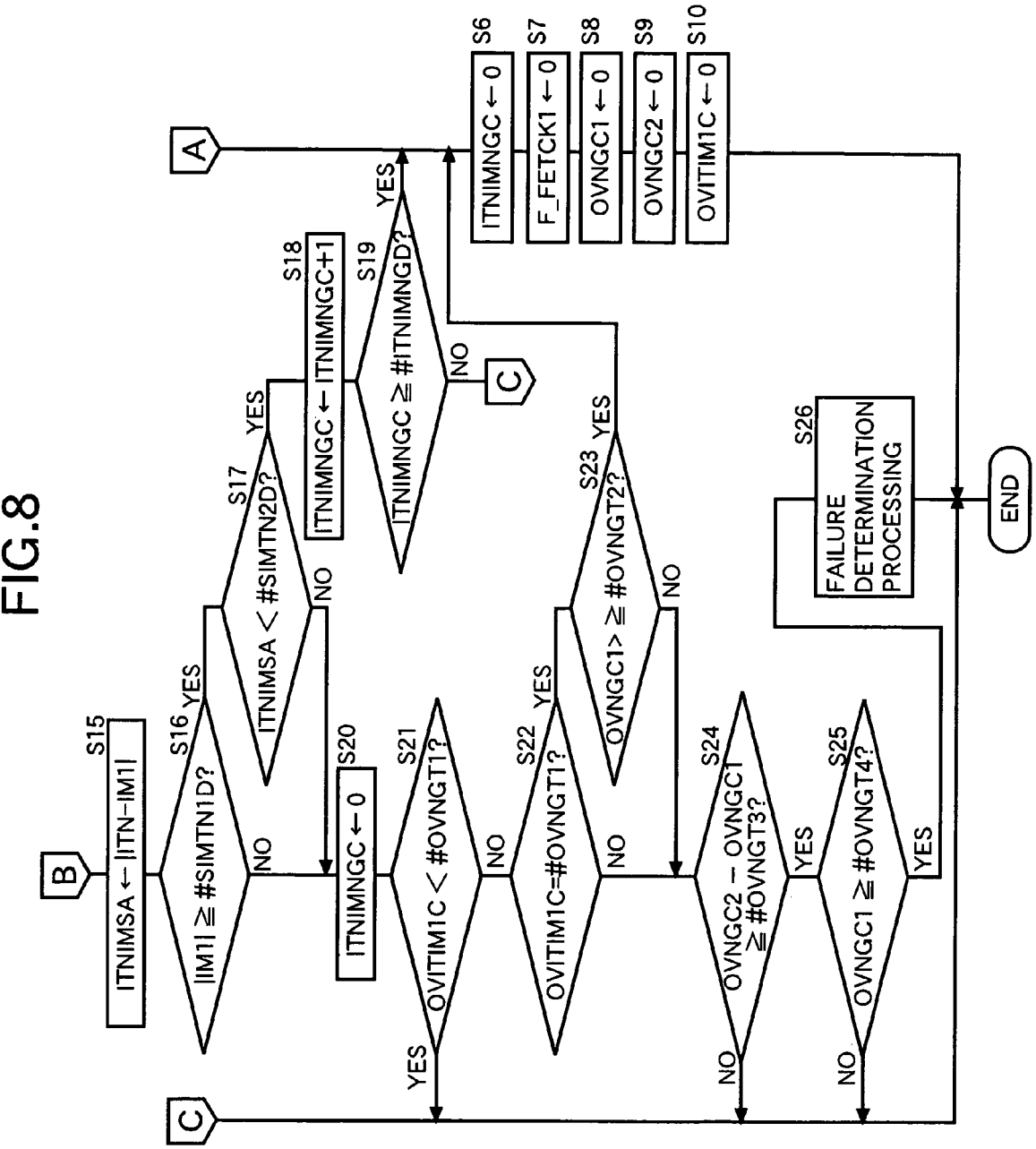
FIG. 8 is a second section of a flowchart for explaining the operation.

Since this hunting phenomenon is due to an ON failure among the first to the fourth switching elements 46a to 46d, by detecting in this embodiment a hunting phenomenon based on a cumulative time for which the actual current is equal to or greater than an upper limit value and a cumulative time for which it is equal to or less than a lower limit value, an ON failure among the first to the fourth switching elements 46a to 46d is determined. The operation thereof is explained below with reference to the flowcharts of FIG. 7 and FIG. 8.

This failure detection is started when an actual current IM1 detected by the motor current detection circuit 49 is equal to or greater than a threshold value #STARTON2 (20 A in the embodiment), and while the failure detection is carried out a failure detection execution flag F_FETCK1 is set to '1'. If in Step S1 the failure detection execution flag F_FETCK1 is reset to '0' and failure detection is not being executed, and if in Step S2 the actual current IM1 is equal to or greater than the threshold value #STARTON2, then in Step S3 the failure detection execution flag F_FETCK1 is set to '1'.

While failure detection is being executed, in Step S4 a main timer OVITIM1C is incremented, if in Step S5 the main timer OVITIM1C is equal to or greater than a threshold value #OVITIMD (180 ms in the embodiment), then it is determined that an ON failure among the first to the fourth switching elements 46a to 46d has not occurred, in Step S6 an erroneous determination prevention counter ITNIMNGC is reset, in Step S7 the failure detection execution flag F_FETCK1 is reset, in Step S8 an upper cumulative counter OVNGC1 is reset, in Step S9 a lower cumulative counter OVNGC2 is reset, and in Step S10 the main timer OVITIM1C is reset. Also, when in the Step S2 the actual current IM1 is less than the threshold value #STARTON2, resetting is carried out in Steps S6 to S10.

If in Step S5 the main timer OVITIM1C, which starts at the same time as failure detection starts, is less than the threshold value #OVITIMD and in Step S11 the actual current IM1 of the motor M is equal to or greater than a threshold value #OVCUR1D (20 A in the embodiment), then in Step S12 the upper cumulative counter OVNGC1 is incremented, and if in Step S13 the actual current IM1 of the motor M is equal to or less than a threshold value #OVCUR2D (3 A in the embodiment), then in Step S14 the lower cumulative counter OVNGC2 is incremented.

Figure 9:
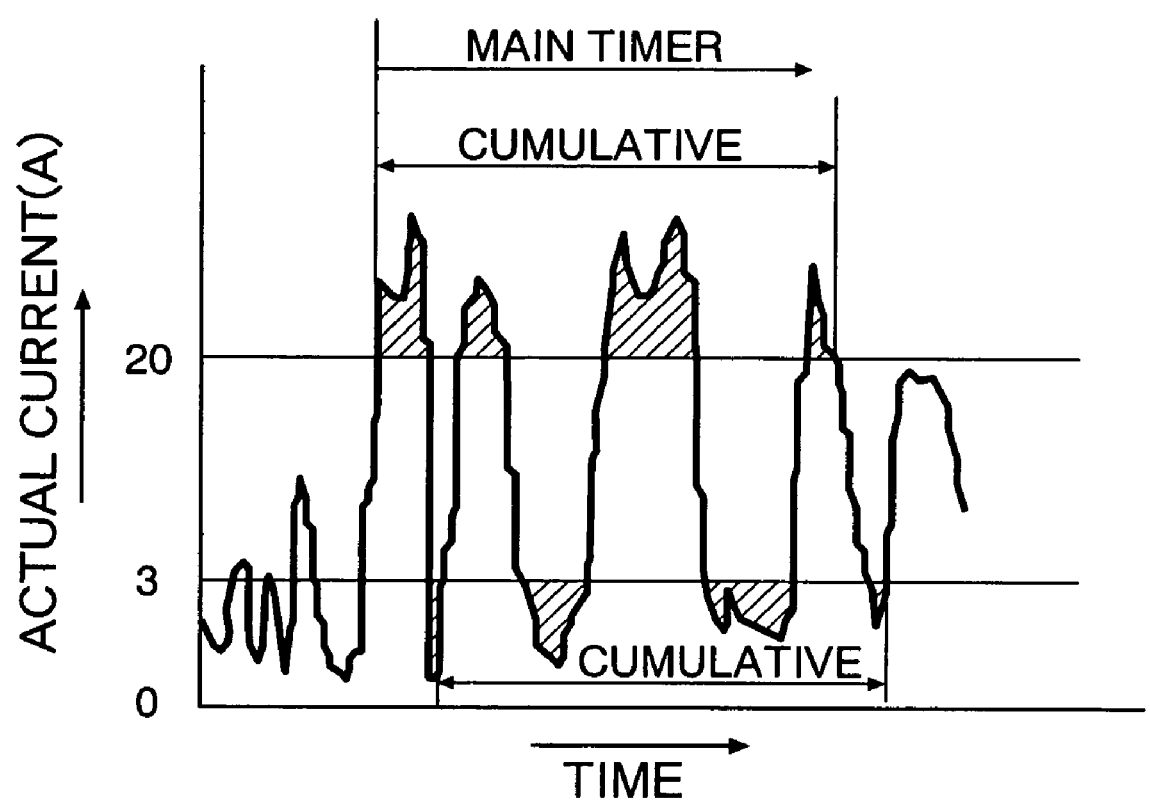
FIG. 9 is a time chart for explaining the operation.

That is, as shown in FIG. 9, when the actual current IM1 exceeds 20 A, the main timer OVITIM1C starts, and if the actual current IM1 of the motor M becomes equal to or greater than 20 A before 180 ms has elapsed, the upper cumulative counter OVNGC1 is incremented, and if the actual current IM1 of the motor M becomes equal to or less than 3 A, the lower cumulative counter OVNGC2 is incremented.

In a subsequent Step S15, a deviation ITNIMSA of the actual current IM1 from a target current ITN of the motor M is calculated, and if in Step S16 the actual current IM1 is equal to or greater than a threshold value #SIMTN1D (5 A in the embodiment) and in Step S17 the deviation ITNIMSA is less than a threshold value #SIMTN2D (3 A in the embodiment), then in Step S18 the erroneous determination prevention counter ITNIMNGC is incremented. If in Step S19 the erroneous determination prevention counter ITNIMNGC is equal to or greater than a threshold value #ITNIMNGD (1.5 ms in the embodiment), the sequence moves to Steps S6 to S10, and it is determined that the situation is normal. If in Step S16 the actual current IM1 is less than the threshold value #SIMTN1D or if in Step S17 the deviation ITNIMSA is equal to or greater than the threshold value #SIMTN2D, then in Step S20 the erroneous determination prevention counter ITNIMNGC is reset.

Steps S15 to S20 have the following meaning. When there is an ON failure among the first to the fourth switching elements 46a to 46d, the deviation ITNIMSA of the actual current IM1 from the target current ITN generally becomes large due to the hunting of the actual current IM1. In contrast, when there is no ON failure, the deviation ITNIMSA of the actual current IM1 from the target current ITN generally becomes small. Therefore, when a state in which the actual current IM1 is equal to or greater than 5 A and the deviation ITNIMSA is less than 3 A continues for 1.5 ms or longer, it is determined that the actual current IM1 is not hunting, thereby preventing an erroneous determination of failure among the first to the fourth switching elements 46a to 46d.

In subsequent Steps S21 and S22, at the instant the main timer OVITIM1C reaches the threshold value #OVNGT1 (20 ms in the embodiment), that is, at the instant 20 ms has elapsed after the actual current IM1 becomes equal to or more than 20 A and failure detection is started, if in Step S23 the upper cumulative counter OVNGC1 is equal to or greater than the threshold value #OVNGT2 (15 ms in the embodiment), the sequence moves to Steps S6 to S10 and it is determined that the situation is normal.

Steps S21 to S23 have the following meaning. Since the actual current IM1 is hunting when there is an ON failure among the first to the fourth switching elements 46a to 46d, the proportion of the time for which the actual current IM1 is equal to or greater than 20 A should not be too large. Regardless of this, if the actual current IM1 is equal to or greater than 20 A for over 15 ms among the 20 ms, it is determined that there is no hunting, thereby preventing an erroneous determination of failure among the first to the fourth switching elements 46a to 46d.

In a subsequent Step S24, if a value obtained by subtracting the upper cumulative counter OVNGC1 from the lower cumulative counter OVNGC2 is equal to or less than a threshold value #OVNGT3 (30 ms in the embodiment) and in Step S25 the upper cumulative counter OVNGC1 is equal to or greater than a threshold value #OVNGT4 (25 ms in the embodiment), then in Step S26 it is determined that there is an ON failure of one of the first to the fourth switching elements 46a to 46d, failure determination is carried out, and control of the electric power steering system is stopped.

Steps S24 to S26 have the following meaning. When the value obtained by subtracting the upper cumulative counter OVNGC1 from the lower cumulative counter OVNGC2 is equal to or greater than 30 ms and in Step S25 the upper cumulative counter OVNGC1 is equal to or greater than 25 ms, then the lower cumulative counter OVNGC2 is equal to or greater than 55 ms. In this way, if while the main timer OVITIM1C counts to 180 ms the upper cumulative counter OVNGC1 becomes equal to or greater than 25 ms and the lower cumulative counter OVNGC becomes equal to or greater than 55 ms, this is because the actual current IM1 is hunting rapidly, and it is thereby possible to determine that there is an ON failure of one of the first to the fourth switching elements 46a to 46d.

As described above, since failure determination is carried out based on the cumulative value of the time for which the actual current IM1 detected by the motor current detection circuit 49 is equal to or greater than 20 A and the cumulative value of the time for which it is equal to or less than 3 A, even when the above-mentioned 20 A and 3 A are included in the range of variation of the actual current IM1 when the situation is normal, it is possible to determine, with good precision, whether there is an ON failure among the first to the fourth switching elements 46a to 46d.

The same phenomenon as the above-mentioned ON failure among the first to the fourth switching elements 46a to 46d might occur in some cases if the H-bridge circuit 41 is short-circuited in any position.

Although one embodiment of the present invention has been described above, the present invention is not limited to the above-mentioned embodiment and can be modified in a variety of ways without departing from the subject matter of the present invention described in the claims.

For example, the first to the fourth switching elements 46a to 46d are not limited to field-effect transistors (FET), and may be other types of switching element such as insulating gate bipolar transistors (IGBT).

Furthermore, in the embodiment failure detection is carried out based on a value obtained by subtracting the upper cumulative counter OVNGC1 from the lower cumulative counter OVNGC2 and on the count value of the upper cumulative counter OVNGC1, but failure detection may be carried out based on the count value of the upper cumulative counter OVNGC1 and the count value of the lower cumulative counter OVNGC2.

Moreover, the means for detecting the actual current IM1 of the motor M is not limited to the shunt resistor 42 of the embodiment, and may be any other means such as an ammeter.

Furthermore, the present invention is applicable to a drive circuit for a three-phase alternating current motor.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A failure detection system for an electric power steering system, comprising:
   a bridge circuit that is disposed between a battery and a steering motor and drives the motor in forward and reverse direction;
   an actual current detection means for detecting the actual current supplied from the battery to the motor via the bridge circuit;
   a control means for carrying out feedback control so that the actual current coincides with a target current;
   wherein the bridge circuit comprising:
      a high voltage terminal connected to a positive pole of the battery;
      a low voltage terminal connected to a negative pole of the battery;
      first and second output terminals connected to the motor;

a first switching element providing a connection between the low voltage terminal and the first output terminal;

a second switching element providing a connection between the low voltage terminal and the second output terminal;

a third switching element providing a connection between the high voltage terminal and the first output terminal; and a fourth switching element providing a connection between the high voltage terminal and the second output terminal;

wherein the control means determines that there is an ON failure among the first to the fourth switching elements based on a first cumulative time for which the actual current is equal to or greater than an upper limit value until a timer has timed up and a second cumulative time for which the actual current is equal to or less than a lower limit value until the timer has timed up.

2. The failure detection system for the electric power steering system according to claim 1, wherein the control means disables determination of an ON failure among the first to the fourth switching elements if the first cumulative time reaches a second predetermined time when the timer has reached a first predetermined time.

3. The failure detection system for the electric power steering system according to claim 1, wherein the control means disables determination of an ON failure among the first to the fourth switching elements when a state in which the actual current is equal to or greater than a first threshold value and the deviation of the actual current from the target current is less than a second threshold value exists for a third predetermined time or greater.

* * * * *